(12) United States Patent
Edwards-Millgate

(10) Patent No.: US 12,387,078 B2
(45) Date of Patent: Aug. 12, 2025

(54) NEAR FIELD COMMUNICATION HOUSING STRUCTURE

(71) Applicant: Rivendell Creations LLC, Sheridan, WY (US)

(72) Inventor: Kelly Ann Edwards-Millgate, Los Angeles, CA (US)

(73) Assignee: Rivendell Creations LLC, Sheridan, WY (US)

( * ) Notice: Subject to any disclaimer, the term of this patent is extended or adjusted under 35 U.S.C. 154(b) by 0 days.

(21) Appl. No.: 18/145,447

(22) Filed: Dec. 22, 2022

(65) Prior Publication Data

US 2024/0211715 A1    Jun. 27, 2024

(51) Int. Cl.
*G06K 19/07*    (2006.01)
(52) U.S. Cl.
CPC ................. *G06K 19/0727* (2013.01)
(58) Field of Classification Search
CPC .................................................. G06K 19/0727
See application file for complete search history.

(56) References Cited

U.S. PATENT DOCUMENTS

| | | | |
|---|---|---|---|
| 6,510,988 B1 * | 1/2003 | Kraus | G06K 19/041 235/382 |
| 8,181,881 B2 | 5/2012 | Pedicano | |
| 8,267,325 B2 | 9/2012 | Phaneuf | |
| 8,646,695 B2 | 2/2014 | Worrall et al. | |
| 8,857,716 B1 * | 10/2014 | Giobbi | G08B 13/2462 235/435 |
| 9,336,477 B2 | 5/2016 | Nitta | |
| 9,456,063 B2 * | 9/2016 | Mercando | H04W 4/027 |
| 9,619,745 B1 | 4/2017 | Chabbott | |
| 9,811,955 B2 | 11/2017 | Russell et al. | |
| 9,852,367 B2 | 12/2017 | Boulby | |
| 9,980,402 B2 | 5/2018 | Huitema et al. | |
| 10,108,900 B2 * | 10/2018 | Huynh | A44C 17/02 |
| 10,210,690 B1 * | 2/2019 | Foran | G07C 9/00944 |
| 10,379,576 B1 | 8/2019 | Lettow | |
| 10,459,485 B2 | 10/2019 | Inagaki et al. | |
| 10,599,968 B2 | 3/2020 | Rosenholtz | |
| 10,700,422 B2 | 6/2020 | Moon et al. | |
| 10,733,495 B2 | 8/2020 | Ennis et al. | |

(Continued)

FOREIGN PATENT DOCUMENTS

| | | |
|---|---|---|
| CN | 204012808 U | 12/2014 |
| CN | 206791831 U | 12/2017 |

(Continued)

*Primary Examiner* — Steven S Paik
*Assistant Examiner* — Asifa Habib
(74) *Attorney, Agent, or Firm* — SLATER MATSIL, LLP

(57) ABSTRACT

An embodiment device includes a first housing formed of a first radio-transparent material and having an outer perimeter surface including a first outer perimeter portion and a second outer perimeter portion, the outer perimeter surface having one or more recesses, each of the one or more recesses extending from one of the first outer perimeter portion or the second outer perimeter portion into a body of the first housing, a second housing formed of a second radio-transparent material and secured to the first housing, a near field communication (NFC) chip disposed between the first housing and the second housing, a link having a first end and a second end extending into the body of the first housing.

20 Claims, 7 Drawing Sheets

(56) References Cited

U.S. PATENT DOCUMENTS

| | | | |
|---|---|---|---|
| 10,824,930 B2 | 11/2020 | Robadey et al. | |
| 11,086,357 B2 | 8/2021 | Inagaki et al. | |
| 11,113,482 B1* | 9/2021 | Giobbi | G06K 7/01 |
| 11,188,124 B2 | 11/2021 | von Badinski et al. | |
| 11,200,477 B2* | 12/2021 | Browning, Jr. | G06K 19/07749 |
| D953,905 S * | 6/2022 | Barovic | D10/104.1 |
| 11,630,551 B1* | 4/2023 | Chao | G06F 3/04812 |
| | | | 715/835 |
| D1,012,485 S * | 1/2024 | Tsai | D3/215 |
| D1,012,488 S * | 1/2024 | Tsai | D3/215 |
| 11,931,643 B1* | 3/2024 | Hopkins | A63C 11/003 |
| 2010/0043491 A1 | 2/2010 | Rossi | |
| 2014/0266624 A1 | 9/2014 | van Bosch et al. | |
| 2015/0235120 A1 | 8/2015 | Warren | |
| 2016/0004952 A1 | 1/2016 | Mei | |
| 2016/0135576 A1* | 5/2016 | Purlee | A45F 5/004 |
| | | | 24/3.1 |
| 2016/0196487 A1 | 7/2016 | Huynh | |
| 2016/0232439 A1* | 8/2016 | Huynh | H04B 5/22 |
| 2017/0022025 A1* | 1/2017 | Burner | G09F 21/02 |
| 2017/0172002 A1 | 6/2017 | Huitema et al. | |
| 2018/0041859 A1 | 2/2018 | Forster | |
| 2019/0087705 A1 | 3/2019 | Bourque et al. | |
| 2019/0387848 A1 | 12/2019 | Leybourn | |
| 2020/0012912 A1* | 1/2020 | Klimt | G06K 19/0723 |
| 2020/0042977 A1 | 2/2020 | Boulby | |
| 2020/0397127 A1* | 12/2020 | Jeong | A45F 5/004 |
| 2021/0182650 A1* | 6/2021 | Lotya | G06K 19/07783 |
| 2021/0208693 A1* | 7/2021 | Root | H04W 4/90 |
| 2021/0328351 A1* | 10/2021 | Avser | H01Q 19/028 |
| 2022/0006143 A1* | 1/2022 | Graham | H01Q 1/2225 |
| 2022/0006892 A1* | 1/2022 | Perkins | H01R 4/28 |
| 2024/0037365 A1* | 2/2024 | Hopkins | G06K 19/07745 |
| | | | D10/104.2 |
| 2024/0254809 A1* | 8/2024 | Wright | G06K 19/07749 |
| 2024/0387984 A1* | 11/2024 | Marin | G04R 60/06 |

FOREIGN PATENT DOCUMENTS

| | | |
|---|---|---|
| TW | I655807 B | 4/2019 |
| WO | 2022251483 A1 | 12/2022 |

* cited by examiner

NEAR FIELD COMMUNICATION HOUSING STRUCTURE

TECHNICAL FIELD

The present invention relates generally to a device and method for a near field communication (NFC) housing structure, and, in particular embodiments, to a device and method for an NFC housing structure that can be worn by a user.

BACKGROUND

Radio frequency identification (RFID) technology may be used for multiple purposes. Near field communication (NFC) is a more effective form of RFID. NFC can operate in one way or two way communication. In NFC, an initiator (active) device, such a phone, and a target (passive) device, such a wearable, communicate via an active NFC chip and a passive NFC chip, respectively. The reader generates an electromagnetic field to power the passive chip.

SUMMARY

An embodiment device includes a first housing formed of a first radio-transparent material and having an outer perimeter surface including a first outer perimeter portion and a second outer perimeter portion, the outer perimeter surface having one or more recesses, each of the one or more recesses extending from one of the first outer perimeter portion or the second outer perimeter portion into a body of the first housing, a second housing formed of a second radio-transparent material and secured to the first housing, a near field communication (NFC) chip disposed between the first housing and the second housing, where the NFC chip is enclosed by both the first housing and the second housing, and a link having a first end and a second end, where the first end extends from the first outer perimeter portion into the body of the first housing towards the second housing, and the second end extends from the second outer perimeter portion into the body of the first housing towards the first outer perimeter portion.

An embodiment device includes a first housing formed of a radio-transparent material and having an outer perimeter surface with a first outer perimeter portion, a second outer perimeter portion, the outer perimeter surface having one or more recesses, each of the one or more recesses extending from the first outer perimeter portion or the second outer perimeter portion into a body of the housing, where the outer perimeter surface has a lobe at least partially defined by the first outer perimeter portion and the second outer perimeter portion, and where the one or more recesses are disposed in the lobe, a second housing formed of a second radio-transparent material secured to the first housing, a near field communication (NFC) chip disposed between the first housing and the second housing, where the NFC chip is enclosed by both the first housing and the second housing, one or more recesses disposed in the lobe, and a link having a first end and a second end, where the first end extends from the first outer perimeter portion into the body of the first housing towards the second housing, and the second end extends from the second outer perimeter portion into the body of the housing towards the first outer perimeter portion.

An embodiment method includes providing a first housing formed of a first radio-transparent material having an outer perimeter surface having a first outer perimeter portion and a second outer perimeter portion, the outer perimeter surface having one or more recesses, each of the one or more recesses extending from one of the first outer perimeter portion or the second outer perimeter portion into a body of the first housing, providing a second housing formed of a second radio-transparent material, securing an near field communication (NFC) chip in the second housing, securing the second housing in the first housing, where the NFC chip is enclosed by both the first housing and the second housing, and attaching a link having a first end and a second end, where the first end extends from the first outer perimeter portion into the body of the first housing towards the second housing, and the second end extends from the second outer perimeter portion into the body of the first housing towards the first outer perimeter portion.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1A:
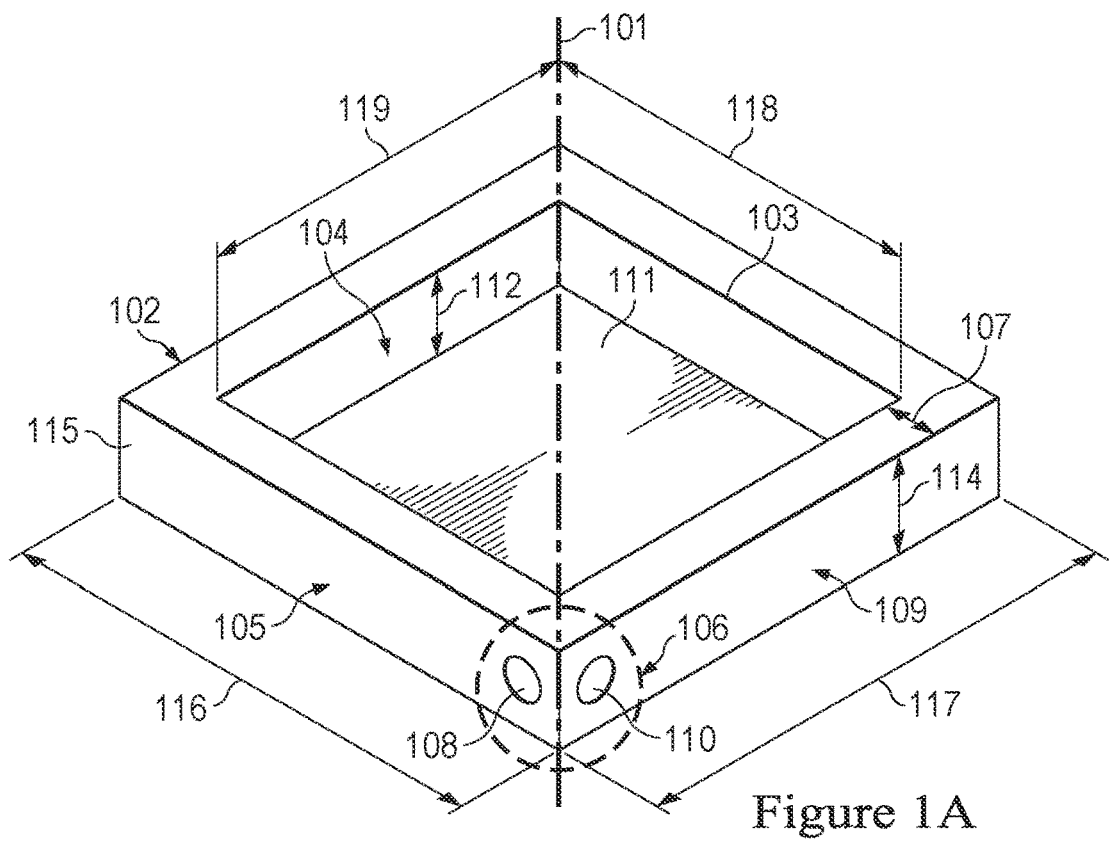
FIGS. 1A-1D illustrate components of an NFC housing structure according to embodiments.

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Embodiments of the present application relate to an NFC housing structure that can be connected to a substrate via a connector that can be worn by a user.

NFC chip wearables can be used for numerous applications. For example, NFC wearables can be used for credit card transactions or healthcare applications. Additionally, the NFC wearables may be used to provide a connection to content, services, or the like for assisting a user in executing a task. For example, NFC wearables may be used to provide content, such as a reference location related to health updates for a user, alerts for a user regarding the status of their medications, or even to provide a user with personalized instructions in a health crisis such as a panic attack. In some other examples, a wheelchair user may use the wearable to open or unlock a door, start a car, automatically dial a telephone, or access web-based content. In some embodiments, the NFC chip in a wearable may be an RFID chip with additional memory, processing or communication circuits, or the like, and, and may hold additional information related to a user, such as contact information, medical information, or the like. In some embodiments, the RFID chip may provide tracking of a user, for example, through active communications such as transmitting a location though a cellular or other wireless connection, through passive communication, such as providing a 'ping' or response to a message from a communications device or network, or the like.

In operation, when a passive NFC chip is brought within range of an active NFC chip the active chip generates a magnetic field. The passive NFC chip is powered by the active chip and modulates the magnetic field. When designing wearables for a user containing an NFC chip, the NFC chip may be located in a housing. The housing may provide a protective structure for the NFC chip. The housing may then be connected to a chain, rope, or band to form a wearable that can be worn by the user. For example, a wearable may be a bracelet or a necklace.

To make a wearable comfortable for a user, NFC housings are made to be as compact as possible.

Embodiments relate to an NFC housing structure that can be connected to a wearable via a connector, such as a link, while still having dimensions small enough to be comfortable for the user without any interference between the connector and the NFC chip. In various embodiments, the NFC housing structure may include a second housing secured within a first housing. An NFC chip may be secured in the second housing and enclosed by both of the housings. This will be described in more detail below.

The first housing may include an outer perimeter surface that forms a lobe. The lobe may be at least partially defined by a first outer perimeter portion and a second outer perimeter portion of the outer perimeter surface. The dimensions and shape of the first housing allow for one or more recesses to be disposed within the lobe without penetrating the second housing. The geometry and dimensions of the first housing, therefore, allows one or more recesses to be formed in the lobe that are small enough to secure the connector. The one or more recesses secure the connector so that the connector is separated from the NFC chip by enough of a distance so that it does not interfere with the NFC chip. The connector may be a metallic connector to provide an improved mechanical connection to the NFC housing structure. Using a metallic link provides a stronger connection between the first housing and a rope or chain of a user wearable. The spacing between the connector and the NFC chip allows for use of a metallic connector because the spacing prevents the metallic connector from acting as an antenna of NFC chip and prevents the metallic chip from interfering and weakening the electromagnetic signals transmitted to and from the NFC chip.

FIGS. 1A-1D illustrate components of an NFC housing structure according to embodiments. FIG. 1A is an isometric view illustrating a first housing of the NFC housing structure according to some embodiments.

A first housing 102 may include a first cavity 104 and one or more recesses disposed in a lobe 106. The first housing 102 may be formed of a first radio transparent material, and may have a first thickness. The first thickness may be between 2.5 and 6 mm, for example 3 mm.

The first housing 102 may be manufactured from any suitable radio transparent material. For example, from a hardwood such as maple, walnut, or the like. In other embodiments, the first housing 102 may be formed from a radio transparent resin or synthetic material, such as acrylic, polyethylene, fiberglass composites, glass, sapphire, or the like, with the radio transparent material or a combination of materials being sufficiently strong to handle machining or forming processes as described below. The material of the first housing 102 is not limited to the disclosed embodiments, as other advantageous materials, or combinations of materials, may be employed.

In various embodiments, the first housing 102 may have a rectangular or square cross-sectional shape a length 116 and width 117 that are substantially equal, along with a height 114. The length 116 and the width 117 may each be within a range of 10 mm to 50 mm, for example 15 mm. The height 114 may be within a range of 1 mm to 3 mm, for example 2 mm. In other embodiments, the cross-sectional shape of the first housing 102 may be a rectangle, a circle, an "eye" shape, a flower shape, a star, or the like. The cross-sectional shape of the first housing 102 is not limited to the disclosed embodiments, as other advantageous shapes may be used. Advantageously, the shape and the dimensions of the first housing allow for the formation of one or more recesses in an outer perimeter surface 115 of the first housing 102 that house, retain, accept, or secure a connector. The one or more recesses may be formed in a lobe so that the one or more recesses are spaced at a distance away from the second housing securing an NFC chip. The spacing between the one or more recesses and the NFC chip ensure that the connector does not interfere with the NFC chip.

The first housing 102 may have an outer perimeter surface 115 surrounding a body of the housing in which the first cavity 104 is disposed. The first cavity 104 may have a square shape. On the other hand, the first cavity 104 may have a shape that is rectangular, round, or any other shape. The first cavity 104 may be sized to secure or hold a second housing holding an NFC chip. The shape of the first cavity 104 may be the same or different from the cross-sectional shape of the first housing 102.

Figure 1B:
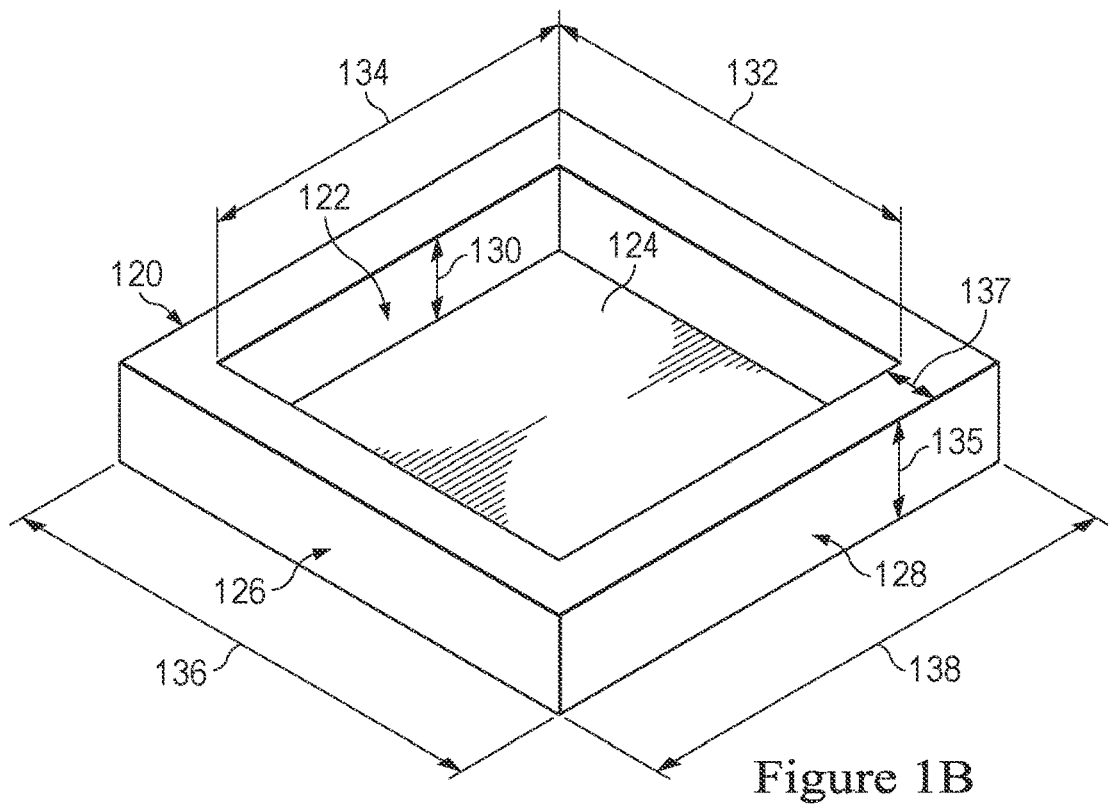

FIG. 1B illustrates an isometric view of a second housing of the NFC housing structure according to some embodiments. In various embodiments, the first cavity 104 may be configured or sized to accept or secure a second housing 120 holding an NFC chip. The first cavity 104 may be configured so that the second housing 120 fits securely inside of it. In addition, the of the first cavity 104 may have a wall thickness 107 between 1.2 mm and 4.0 mm, for example 1.3 mm. However, based on the material type or shape, the minimum wall thickness 107 may be higher. For example, a softer material requires a higher minimum wall thickness 107. In embodiments where the first cavity 104 is a square cross-sectional shape, it may have a length 118 and width 119 between 5 mm and 45 mm, for example 12.5 mm. The depth 112 of the first cavity 104, regardless of shape, may be between 1 mm and 4.5 mm, for example 2 mm.

The outer perimeter surface 115 of the first housing 102 may comprise at least two outer perimeter portions 105, 109. Each portion of the outer perimeter surface 115 may correspond to the outer walls of the first housing 102. For example, the first housing 102 in FIG. 1A includes a first outer perimeter portion 105, a second outer perimeter portion 109, a third outer perimeter portion (not shown) and a fourth outer perimeter portion (not shown).

The outer perimeter surface 115 defines the outer perimeter of the walls of the first housing 102 that surround the first cavity 104. The outer perimeter surface 115 forms one or more lobes that allow for one or more recesses to be formed in the first housing 102 that are small enough to secure a connector without penetrating the first cavity 104. The lobes allow for a connector to be secured in the first housing while the link is at a sufficient distance from the first cavity 104 so that the connector does not interfere with the NFC chip.

At least one lobe 106 may be defined by at least one of the outer perimeter portions 105, 109. The lobe 106 may be an area bounded by one or more portions of the outer perimeter surface 115 that provide a region of the body of the first housing 102 that is spaced apart from the first cavity 104. The lobe 106 may be the portions of the first housing 102 that are the farthest away from the first cavity 104. In one embodiment, a lobe 106 may formed where outer perimeter portions of the outer perimeter surface 115 intersect (i.e. meet) For example, as illustrated in FIG. 1A, a lobe 106 may be formed where the first outer perimeter portion 105 and the second outer perimeter portion 109 meet. Additionally, in some embodiments, a lobe 106 may be formed at the second and third outer perimeter portions, the third and fourth outer perimeter portions, and the first and fourth outer perimeter portions. The shape of the lobe 106 may be defined by the shape of the outer perimeter surface 115. For example, if the outer perimeter surface 115 has corners (e.g. a square or a star) the lobe 106 may, in some embodiments, include a corner of the outer perimeter. In other embodiments where the cross-sectional shape of the outer perimeter is round, the lobe 106 may be rounded.

One or more recesses 108, 110 may be disposed within the lobe 106. The one or more recesses 108, 110 may extend from one of first outer perimeter portion 105 or the second outer perimeter portion 109 into the body of the first housing 102. The one or more recesses 108, 110 may secure a connector that may be used to couple the first housing 102 to a substrate, carrier or the like, such a rope or a chain of a bracelet or a necklace. The one or more recesses 108, 110 may be any suitable shape that allows the connector to be secured to a substrate or a carrier. For example, the recesses may be circular, square, triangular or the like.

In various embodiments, the one or more recesses 108, 110 may include two separate recesses 108, 110. A first recess 108 may extend from the first outer perimeter portion 105 into the body of the first housing 102 towards the second outer perimeter portion 109. A second recess 110 may extend from the second outer perimeter portion 109 into the body of the first housing 102 towards the first outer perimeter portion 105. The first recess 108 and the second recess 110 may each extend into the body of the housing to substantially equal depths. In other embodiments, the one or more recesses 108, 110 may be a single recess, such as a through hole, extending from the first outer perimeter portion 105 to the second outer perimeter portion 109. The one or more recesses may also be formed in a second lobe (not shown) that is opposite the first housing 102 from the lobe 106. This allows for a connector to be coupled to opposite lobes and allow both sides of the first housing 102 to be coupled to a wearable. For example, one or more recesses may also be formed at the lobe where the third and fourth outer perimeter surfaces meet.

In some embodiments, the lobe 106 provides an area where the one or more recesses may be formed without penetrating the first cavity 104. Thus, the lobe 106 provides enough distance between the connector and an NFC chip disposed in the cavity to prevent interference between the connector and the chip. This will be shown in more detail below.

FIG. 1B illustrates a second housing 120. The second housing 120 may be formed of a second non-radio transparent material having a second thickness. The second housing 120 may be manufactured from any suitable non-radio transparent acrylic material known in the art. The second thickness 135 may be between 1 mm and 5 mm, for example 2 mm.

The second housing 120 may include a second cavity 122. The second housing 120 may be configured to be secured in the first cavity 104 of the first housing 102. Therefore, the outer perimeter of the second housing 120 is the same shape of the first cavity 104. In one embodiment, the second housing 120 may have a square shape. In other embodiments, the second housing 120 may have a rectangular, circular, oval, or any other cross-sectional shape. The dimensions of the second housing 120 may be sized to fit within the first housing. The second housing may be secured to the first housing using an adhesive. The second housing may have a length 136 and a width 138 between 5 mm and 45 mm, for example 8.4 mm. The second housing 120 may be secured within the first cavity 104 using a suitable attachment structure or system, such as a friction fit, adhesive, latch, screw, or the like.

A second cavity 122 may be formed in the second housing 120. The second cavity may be configured to accept an NFC chip. The shape of the outside portion of the second cavity 122 may be the same as the cross-sectional shape of the NFC chip. Thus, the second cavity 122 may have a square, circular, oval, or any cross-sectional shape to conform to the outside shape of the NFC chip. The second cavity 122 may have a length 132 and a width 134 having sizes provided to fit an NFC chip along with a second adhesive used to secure the chip. The length 132 and the width 134 may be between 3.5 mm and 30 mm, for example about 9 mm. The dimensions of the second cavity 122 ensure that the wall thickness 137 between the second cavity and the second housing 120 may be at least 1.0 mm.

Figure 1C:
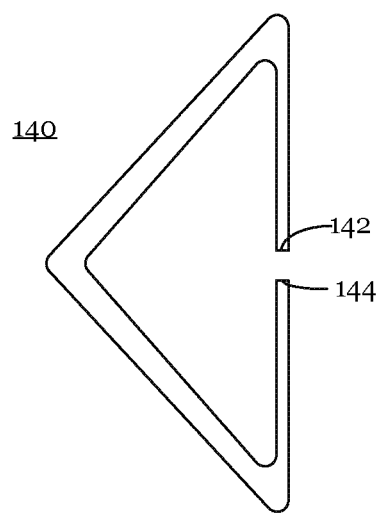

FIG. 1C illustrates a connector that may be used to couple an NFC housing structure to a user's wearable. The connector may be a link 140 that may be a magnetic or ferrous material such as a metal or an alloy, or may be a conductive non-metallic material. In various embodiments, the link 140 may be a bendable metallic material having a first end 142 and a second end 144. For example, the link 140 may be a stainless steel pinch bail link. The link 140 may have a diameter between 0.5 mm and 1 mm, for example, 0.75 mm. The first end 142 and the second end 144 may be bent to form an open shape or a closed shape so long as the link 140 may couple the NFC housing structure to a user's wearable via the one or more recesses. In some embodiments, the link 140 may be bent so that the first end 142 and the second end 144 do not touch. In some embodiments, the link 140 may be bent in a triangular shape, a square shape, a round shape, or another shape allowing the first housing 102 to be coupled to a substrate or a carrier. The shape of the link 140 is not limited by the presented embodiments, as any shape permitting attachment to a substrate or carrier may be advantageously employed.

In various embodiments, the link 140 may be coupled to the first housing 102 by inserting each end into the one or more recesses. The first end 142 and the second end 144 may extend into the body of the first housing 102 from opposite outer perimeter portions 105, 109. For example, the first end 142 may extend from the first outer perimeter portion 105 into the body of the first housing 102 towards the second outer perimeter portion 109. The second end 144 may extend from the second outer perimeter portion 109 into the body of the first housing 102 towards the first outer perimeter portion 105. In other embodiments, the link 140 may be completely closed, or the ends of the link 140 may connect or touch. In such an embodiment, the one or more recesses 108, 110 may be a through hole extending contiguously through the first housing, permitting the link to extend contiguously through the through hole recess.

Figure 1D:
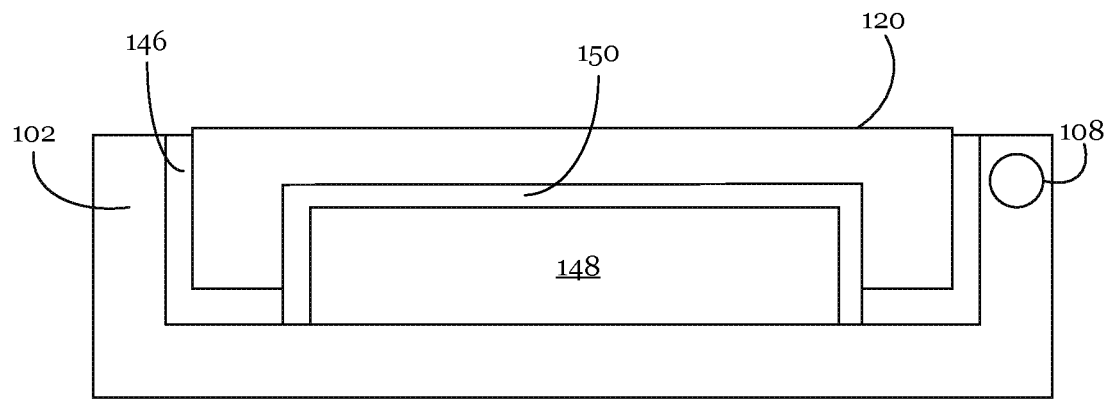

FIG. 1D illustrates a cut-away view of the NFC housing structure along plane 101. The first housing 102 and the second housing 120 may enclose an NFC chip 148. The second housing 120 may be secured to the first housing 102 with the NFC chip 148 face down. The NFC chip 148 may be enclosed between the first housing 102 and the second housing 120. Therefore, the second housing 120 is secured in the first housing 102 such that the bottom surface 124 is flush with or at a level above the upper lip 103 of the first cavity. The second housing 120 may be secured to the first housing using a first adhesive 150. Therefore, the dimensions of the second housing 120 may be configured to fit within the first cavity 104, with additional room for the first adhesive 150. In some embodiments, the first adhesive 150 may be, or may comprise, a liquid adhesive such as Polyvinyl acetate (PVA) glue, cyanoacrylate (CA) glue, epoxy, or the like. In other embodiments, the first adhesive may be, or may comprise, another adhesive such as double sided tape, reactive adhesive, or another adhesive suitable for permanently or semi-permanently attaching the second housing 120 to the first housing 102. In other embodiments, the adhesive may be omitted, and the second housing may be attached to, or retained within the cavity of, the first housing 102 by mechanical fastening such as a friction fit between the first and second housing 102, 120, by mechanical latching elements on the first or second housing 102, 120, by a fastener such as a screw or pin, or by an external retaining elements such as a clip, or another element that retains the second housing in the cavity.

In addition, the walls of the second housing 120 may overlap the walls of the first housing 102 in a vertical direction and when viewed from the side. For example, a first outer perimeter portion 126 of the second housing 120 may overlap the first outer perimeter portion 105 of the first housing 102, a second outer perimeter portion 128 of the second housing 120 may overlap the second outer perimeter portion 109 of the first housing 102, and so on.

The shapes and dimensions between the first housing 102 and the second housing 120 provide a spacing of at least 1 mm between the second cavity 122 and the walls of the first housing 102. Therefore, due to the spacing between the second cavity 122 and the walls of the first housing 102, the one or more recesses 108, 110 are formed only in the outer perimeter of the first housing 102. For example, the second recess 110 may extend from the second outer perimeter portion 109 towards the first outer perimeter portion 105 without penetrating the second housing 120.

While the first housing 102 and second housing 120 are illustrated here as each being single pieces, it should be understood that the first housing 102 and second housing 120 are not limited to such an implementation. For example, either the first housing 102 or second housing 120, or both, may be formed from multiple elements with the second housing 120 still being configured to be at least partially disposed in the first cavity 102. Thus, in an embodiments, the second housing 120 may include an inner second housing that houses the NFC chip, and may further have an outer second housing that at least partially covers the inner second housing. The inner second housing may be formed to secure different shaped NFC chips, and the outer second housing formed to secure the inner second housing in different shaped first cavities. In some embodiments, the outer second housing may also provide decorative features such as colors, or the like, or may be used to grip or provide a region for removing the second housing 120 for replacement of, or access to, the NFC chip 148. Similarly, the first housing 102 may be formed in multiple parts with, for example, an outer first housing providing protective, decorative, or other features, and an inner first housing securing the second housing 102. For example, the outer first housing may include a shock absorbing material such as a silicone material, and the inner first housing may be a more rigid material such as acrylic, polyethylene, fiberglass composite, or the like, with the connector or link 140 extending into the inner first housing to secure the NFC housing to a substrate.

Figure 2A:
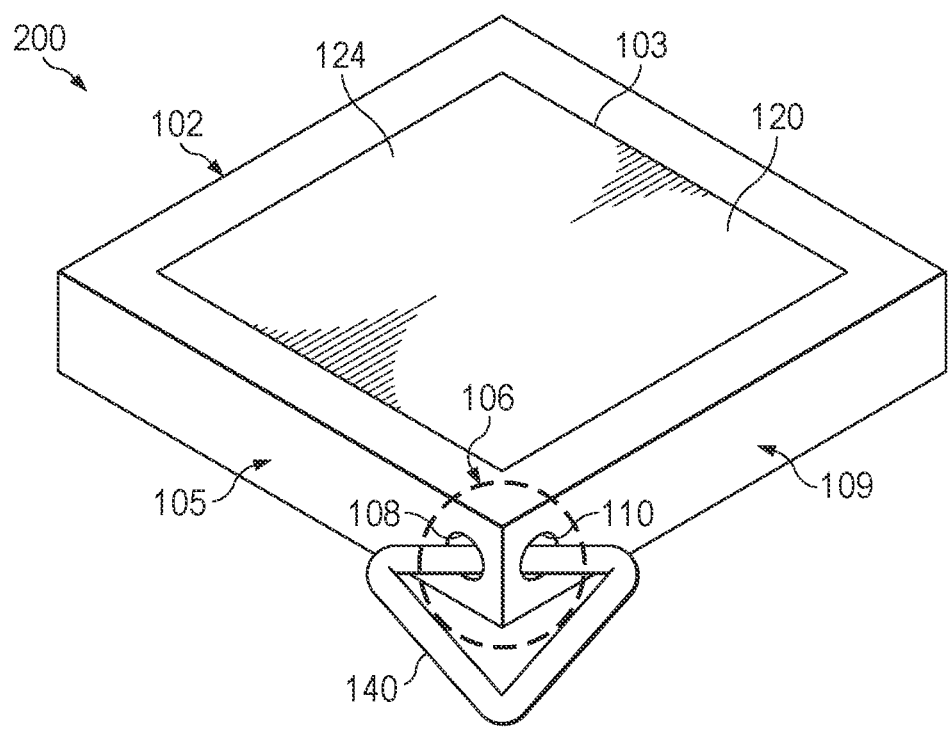
FIGS. 2A-2B illustrate an assembled NFC housing structure according to embodiments.
Figure 2B:
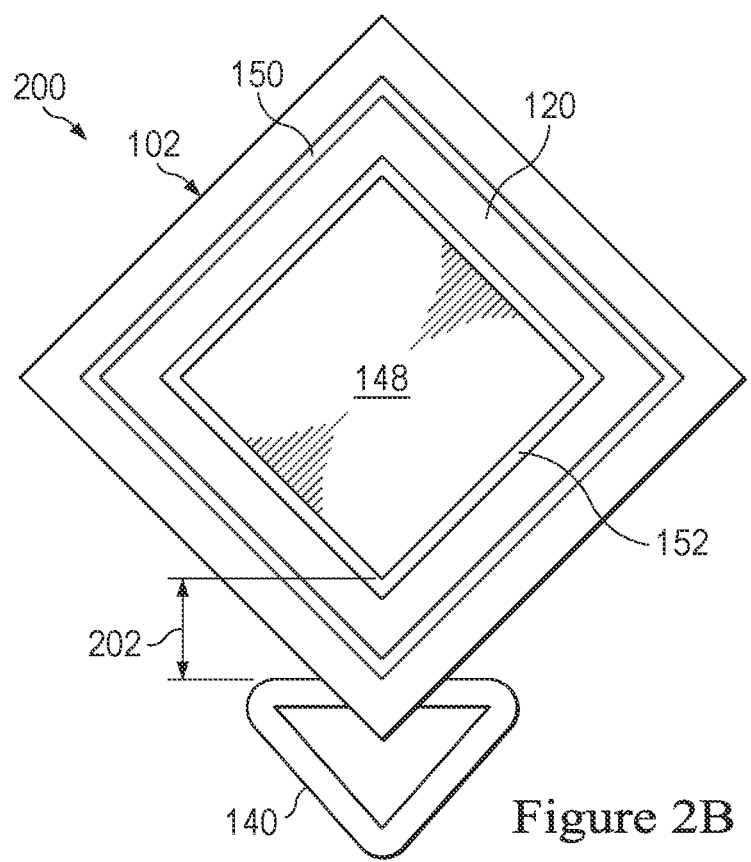

FIGS. 2A-2B illustrate an assembled NFC housing structure according to embodiments, where FIG. 2A illustrates an isometric view of an assembled NFC housing structure and FIG. 2B illustrates a top view of the assembled NFC housing structure.

FIG. 2A is an isometric view of an assembled NFC housing structure 200. The NFC housing structure 200 may have the second housing 120 secured in the first housing 102. The outer walls of the second housing 120 are completely bound by the inner surface of the walls of that define the first cavity 104. Therefore, the NFC chip 148 is secured between the first housing 102 and the second housing 120. The second housing 120 is secured in the first cavity 104 such that the bottom surface 124 of the second cavity is flush with or at a level above the upper lip 103 of the first cavity 104. Advantageously, the NFC chip 148 is protected from the environment and is not visible. The link 140 is coupled to the NFC housing structure 200 via the one or more recesses 108, 110, and is separated from the second cavity 122 by a distance preventing interference between the NFC chip 148 and the link 140. This will be shown in more detail in FIG. 2B below.

FIG. 2B illustrates the top view of an assembled NFC housing structure 200. The second housing 120 is secured to the first housing 102 via the first adhesive 150. Similarly, the NFC chip 148 is secured to the second housing via a second adhesive 152.

When a distance between the NFC chip 148 and a link 140 used to couple an NFC housing structure 200 to a wearable are too close, the link 140 may interrupt the electric field generated by the NFC chip 148. In turn, this may cause interference between the signals exchanged between the passive NFC chip and its corresponding active NFC chip. Therefore, the lobe 106 separates the link 140 and the NFC chip 148 by a distance 202. The distance 202 may be at least 0.5 mm and 15 mm. For example, the distance 202 may be about 1 mm, or greater. The distance 202 ensures that the link 140 does not interfere with the communication with NFC chip 148.

Figure 3A:
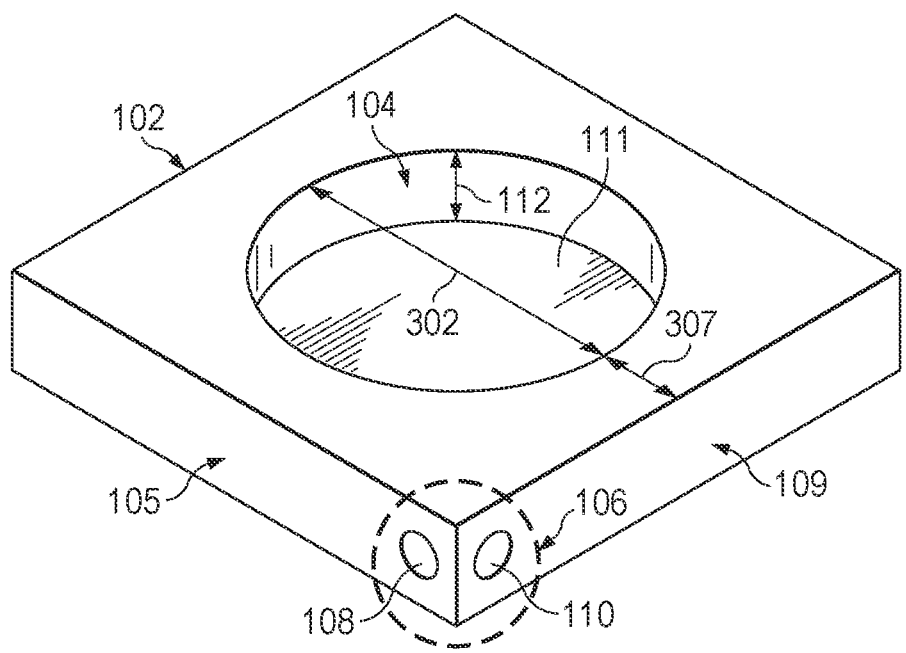
FIGS. 3A-3B illustrate the first housing and the second housing according to an embodiment.
Figure 3B:
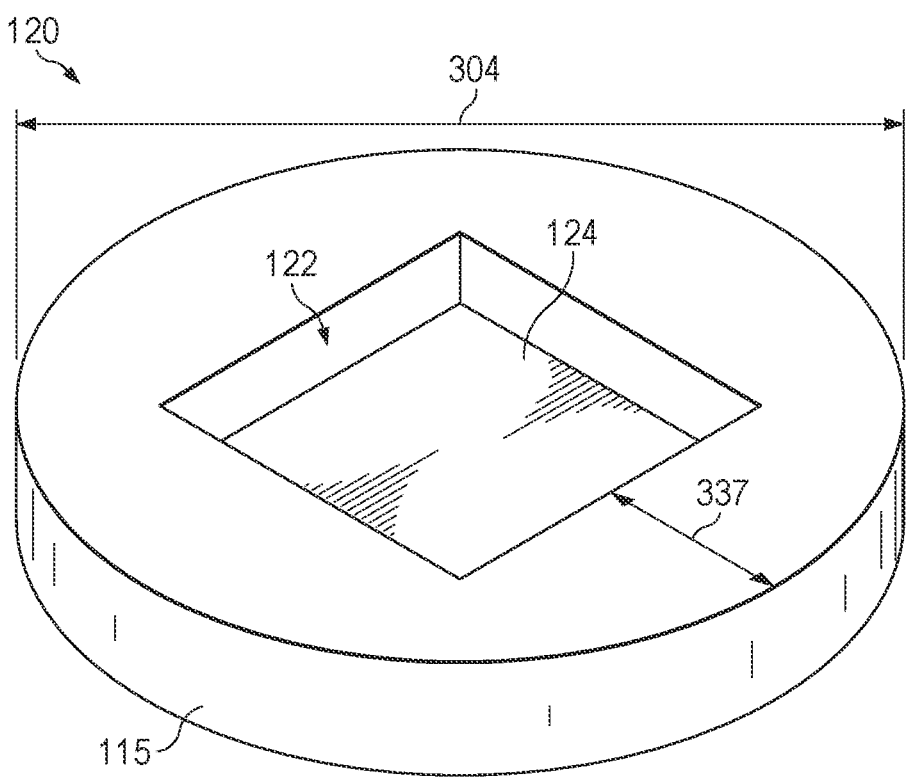

FIGS. 3A-3B illustrate the first housing and the second housing according to embodiments of the presented principles, where FIG. 3A illustrates an isometric view of the first housing having a cavity with a circular cross-sectional shape, and FIG. 3B illustrates an isometric view of the second housing having a circular cross-sectional shape.

The first housing 102 may include a first cavity 104 having a circular shape. Due to the round shape of the first cavity 104, the wall thickness between the edge of the first housing 102 and the first cavity 104 may vary. In various embodiments, the minimum wall thickness 307 between the edge of the first housing 102 may be at least 0.5 mm The diameter 302 of the first cavity 104 may be provided such that the minimum wall thickness 307 is met. In various embodiments, the first cavity 104 may have a diameter 302 between 10 mm and 30 mm, for example 12.2 mm. As described above, while the aforementioned examples show a first cavity 104 having a square or a circle cross-sectional shape, other shapes such as an oval, a rectangle, a dome, or the like may be used.

In some embodiments, the second housing 120 may also have a circular cross section shape so that it can securely fit within the first cavity 104. In various embodiments, the second housing 120 may have a diameter between 10 mm and 30 mm, for example, about 12.2 or 13 mm. As described above, while the aforementioned examples show a second housing 120 having a square or a circle cross shape, other shapes such as an oval, a rectangle, or the like may be used so long as the first cavity 104 and the second housing 120 have the same shape.

In addition, as described above, although the second housing 120 is shown as having a circular shape, the second cavity 122 may have a square shape with the same dimensions described above to secure the NFC chip 148. Due to the round shape of the second cavity 122, the wall thickness between the edge of the second housing 120 and the second cavity 122 may vary. In various embodiments, the minimum wall thickness 337 between the edge of the second housing 120 may be between 0.1 mm and 20.0 mm, for example 1.3 mm. However, in some embodiments, the second cavity 122 may have corners that intersect or touch the outer perimeter surface, as the walls of the second housing 120 may be at least partially enclosed by the first housing 102 when assembled.

While the aforementioned examples show a second cavity 122 having a square shape, other shapes such as an oval, a rectangle, a dome, or the like may be used so long as the second cavity 122 is the same shape as the NFC chip 148.

Figure 4A:
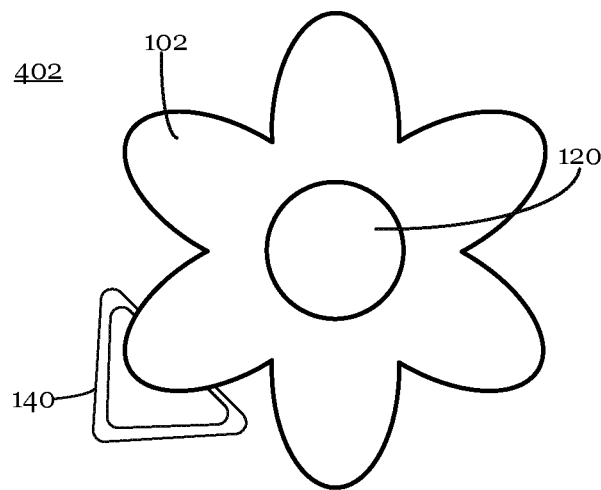
FIGS. 4A-4C illustrate NFC housing with different shapes according to an embodiment.
Figure 4B:
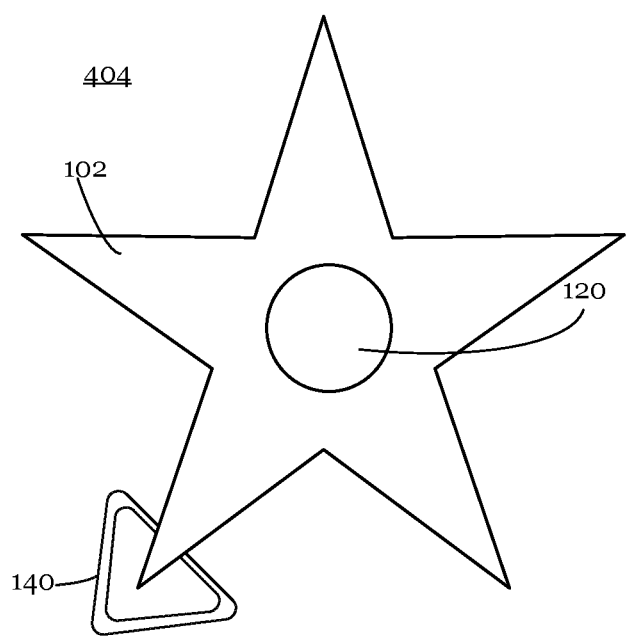
Figure 4C:
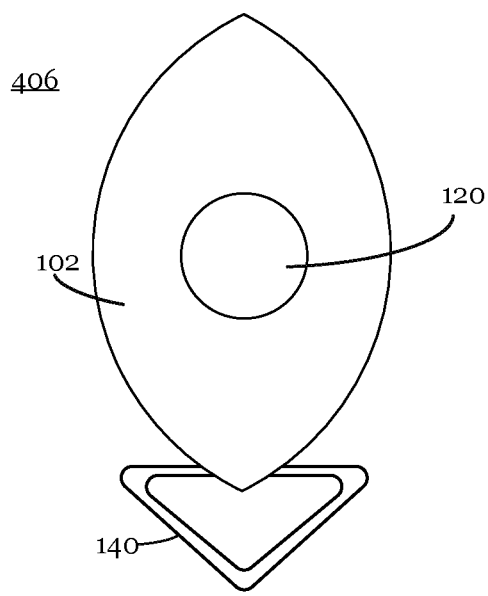

FIGS. 4A-4C illustrate NFC housings with different shapes according to various embodiments.

FIG. 4A illustrates an NFC housing structure 402 with a first housing 102 with a flower shape. The flower shape of the first housing 102 forms rounded lobes that provide an additional distance between the link 140 and the NFC chip. For example, the rounded lobes formed by the flower shape allow for a greater distance between the one or more recesses and the second housing 120 than the first housing 102 described in FIGS. 1A and 3A. Although the flower shape includes six petals, this is for example purposes only, as a first housing 102 in the shape of a flower may include any sufficient quantity of petals. The NFC housing structure 402 may have a second housing 120 having a circular shape. Although the NFC housing structure 402 includes a second housing 120 having a circular shape, this is also for example purposes only. The second housing 120 may be any of the shapes described above.

FIG. 4B illustrates an NFC housing structure 404 with a first housing 102 having a star shape. Advantageously, the first housing 102 having a star shape also forms lobes on each edge of the start that provide an additional distance between the link 140 and the NFC chip. For example, the edges or points of the star shaped housing allow an additional distance between the one or more recesses and the second housing 120 than the edges of the square first housing 102 in FIGS. 1A and 3A. Although a five point star is shown, a star having any number of points can be used. In addition, although a second housing 120 having a round shape is shown, the second housing 120 may have any shape described above.

FIG. 4C illustrates an NFC housing structure 406 having an eye shape. Similarly, the eye shape allows for rounded lobes that provide an additional distance between the link 140 and the second housing 120.

Figure 5:
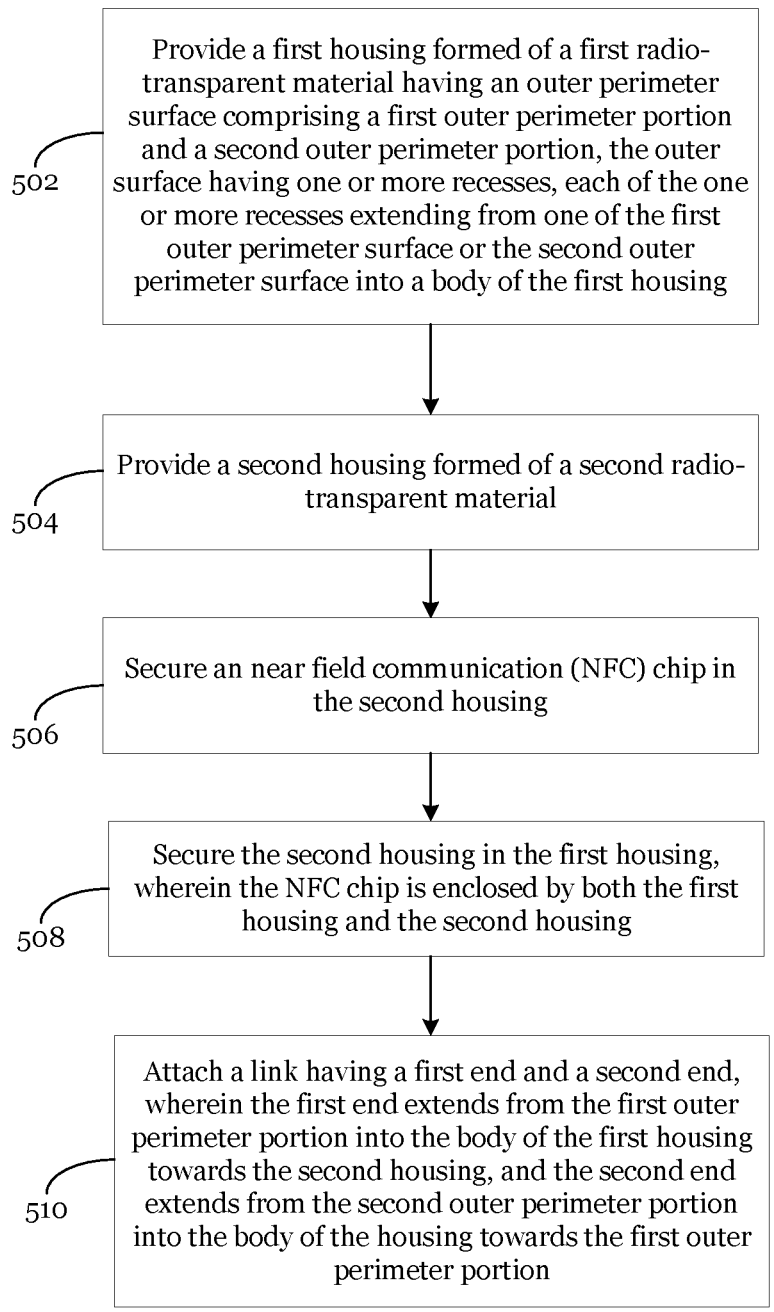
FIG. 5 is a flow diagram illustrating a process for forming an NFC housing.

FIG. 5 is a flow diagram illustrating a method of forming an NFC housing according to an embodiment of the present application.

In block 502, a first housing 102 formed of a first radio transparent material may be provided. The first housing 102 may be formed using a $CO_2$ laser, a mill, a drill or any other mechanical machine. For example, in some embodiments, the first housing 102 may be cut using a $CO_2$ laser using settings that vary based on the hardness of the material used. For example, the first housing 102 may be cut using a 45 Watt $CO_2$ laser in a single pass using full power at a speed of 180 mm/s, but may vary based on material, depth, size of the housing, and the like.

The first housing 102 may include a first cavity 104. The first cavity 104 may be etched using a $CO_2$ laser, a mill, a drill or any other mechanical machine. For example, the first housing 102 may be manufactured using a $CO_2$ laser using settings that vary based on the hardness or type of the material of the first housing 102. For example, the first cavity 104 may be etched using a 45 Watt $CO_2$ laser in two passes, at a speed of 1000 mm/s, at 270 lines/cm, and at full power.

The first housing 102 may include an outer perimeter surface 115 that includes a first outer perimeter portion 105 and a second outer perimeter portion 109. The outer perimeter surface 115 may have one or more recesses 108, 110. Each one of the one or more recesses may extend from the first outer perimeter portion 105 or the second outer perimeter portion 109 and into the body of the first housing 102. The one or more recesses 108, 110 may be manufactured using a $CO_2$ laser, a mill, a drill, or any other mechanical tool. For example, the one or more recess may comprise a first recess 108 and a second recess 110. The first recess 108 may extend from the first outer perimeter portion 105 into the body of the first housing 102 towards the second outer perimeter portion 109. The second recess 110 may extend from the second outer perimeter portion 109 into the body of the first housing 102 towards the first outer perimeter portion 105.

Alternatively, the one or more recess may include a single through hole that extends from the first outer perimeter portion 105 to the second outer perimeter portion 109. The first housing 102 may comprise the same material and may be formed in the same manner described in FIG. 1A described above.

As next illustrated in block 504, and described with reference to FIG. 1B, a second housing 120 may be provided. The second housing 120 may comprise the same material and may be formed in the same manner described in FIG. 1B above. The second housing 120 may be manufactured using a $CO_2$ laser, a mill, a drill, casting, molding or any other suitable machine or process. For example, the second housing 120 may be cut using a 45 Watt $CO_2$ laser in a single pass using full power at a speed of 180 mm/s. The second housing may include a second cavity 122. The second cavity 122 may be etched using a $CO_2$ laser, a mill, a drill, casting, molding or any other mechanical machine. For example, the second cavity 122 may be etched using a 45 Watt $CO_2$ laser in two passes, at a speed of 1000 mm/s, at 270 lines/cm, and at full power.

As next illustrated in block 506, and described with reference to FIG. 1D, an NFC chip 148 may be secured within the second housing 120. The NFC chip 148 may be secured in the second housing 120 using the second adhesive.

As next illustrated in block 508, and described with reference to FIG. 1D, and FIGS. 2A-2B, the second housing 120 may be secured in the first housing 102 using the first adhesive 150. The NFC chip 148 may be enclosed by both the first housing 102 and the second housing 120.

As next illustrated in block 510 and described with reference to FIG. 1C, and FIGS. 2A-2B, a link 140 having a first end 142 and a second end 144 may be attached to the first housing 102. The first end 142 may extend from the first outer perimeter portion 105 into the body of the first housing towards the second outer perimeter portion 109. The second end 144 may extend from the second outer perimeter portion 109 into the body of the first housing towards the first outer perimeter portion 105. In other words, both ends of the link 140 may be couple to the first housing 102 via the one or more recesses. The link 140 may be formed in the same manner and comprise the material as the link 140 described in FIG. 1C.

In embodiments, the NFC housing structure 200 may include a one piece housing. For example, the NFC housing structure 200 may include a housing with a slit cut into an edge of the housing that the NFC chip 148 may be inserted into. On the other hand, the NFC housing structure 200 may only include the first housing 102 with the NFC chip 148 being secured and exposed in the first housing 102. Also the NFC housing structure may include three different housings. A first housing may function as an outer housing and two inner housings may be secured within the outer housing that secure the NFC chip 148.

Although the first housing 102 is secured to a substrate using an adhesive, other means may be used. For example, a hole may be drilled in the bottom face 111 of the first housing 102 and a mechanical means such as a screw or rivet may be used to secure the first housing 102 to a substrate prior to securing the second housing 120 in the first housing 102.

In addition, although a metal material is used to couple the NFC housing structure 200 to a user wearable additional means may be used. For example, non-metallic, strong, and bendable materials may be used as the link 140, such as a plastic.

An embodiment device includes a first housing formed of a first radio-transparent material and having an outer perimeter surface including a first outer perimeter portion and a second outer perimeter portion, the outer perimeter surface having one or more recesses, each of the one or more recesses extending from one of the first outer perimeter portion or the second outer perimeter portion into a body of the first housing, a second housing formed of a second radio-transparent material and secured to the first housing, a near field communication (NFC) chip disposed between the first housing and the second housing, where the NFC chip is enclosed by both the first housing and the second housing, and a link having a first end and a second end, where the first end extends from the first outer perimeter portion into the body of the first housing towards the second housing, and the second end extends from the second outer perimeter portion into the body of the first housing towards the first outer perimeter portion.

In some embodiments, the link is formed from a metallic material. In some embodiments, the outer perimeter surface has a lobe at least partially defined by the first outer perimeter portion and the second outer perimeter portion, and the one or more recesses are disposed in the lobe. In some embodiments, the link and the NFC chip are separated by a distance of at least 1 mm. In some embodiments, the one or more recesses include a first recess extending from the first outer perimeter portion into the body of the first housing towards the second outer perimeter portion and a second recess extending from the second outer perimeter portion into the body of the first housing towards the first outer perimeter portion. In some embodiments, the one or more recesses is a single recess that is a through hole extending from the first outer perimeter portion to the second outer perimeter portion. In some embodiments, the first radio-transparent material is wood and the second radio-transparent material is an acrylic material. In some embodiments, a bottom surface of the second housing is flush with or at a level above an upper lip of the first housing.

An embodiment device includes a first housing formed of a radio-transparent material and having an outer perimeter surface with a first outer perimeter portion, a second outer perimeter portion, the outer perimeter surface having one or more recesses, each of the one or more recesses extending from the first outer perimeter portion or the second outer perimeter portion into a body of the housing, where the outer perimeter surface has a lobe at least partially defined by the first outer perimeter portion and the second outer perimeter portion, and where the one or more recesses are disposed in the lobe, a second housing formed of a second radio-transparent material secured to the first housing, a near field communication (NFC) chip disposed between the first housing and the second housing, where the NFC chip is enclosed by both the first housing and the second housing, one or more recesses disposed in the lobe, and a link having a first end and a second end, where the first end extends from the first outer perimeter portion into the body of the first housing towards the second housing, and the second end extends from the second outer perimeter portion into the body of the housing towards the first outer perimeter portion.

In some embodiments, the link is formed from a metallic material. In some embodiments, the link and the NFC chip are separated by a distance of at least 1 mm. In some embodiments, the one or more recesses include a first recess extending from the first outer perimeter portion into the body of the first housing towards the second outer perimeter portion and a second recess extending from the second outer perimeter portion into the body of the first housing towards the first outer perimeter portion. In some embodiments, the one or more recesses is a single recess that is a through hole extending from the first outer perimeter portion to the second outer perimeter portion. In some embodiments, a bottom surface of the second housing is flush with or at a level above an upper lip of the first housing.

An embodiment method includes providing a first housing formed of a first radio-transparent material having an outer perimeter surface having a first outer perimeter portion and a second outer perimeter portion, the outer perimeter surface having one or more recesses, each of the one or more recesses extending from one of the first outer perimeter portion or the second outer perimeter portion into a body of the first housing, providing a second housing formed of a second radio-transparent material, securing an near field communication (NFC) chip in the second housing, securing the second housing in the first housing, where the NFC chip is enclosed by both the first housing and the second housing, and attaching a link having a first end and a second end, where the first end extends from the first outer perimeter portion into the body of the first housing towards the second housing, and the second end extends from the second outer perimeter portion into the body of the first housing towards the first outer perimeter portion.

In some embodiments, the link and the NFC chip are separated by a distance greater than 1 mm. In some embodiments, the outer perimeter surface has a lobe at least partially defined by the first outer perimeter portion and the second outer perimeter portion, and where the one or more recesses are disposed in the lobe. In some embodiments, forming one or more recesses includes forming one recess, the one recess being a through hole extending from the first outer perimeter portion to the second outer perimeter portion. In some embodiments, one or more recesses is a single recess that is a through hole extending from the first outer perimeter portion to the second outer perimeter portion. In some embodiments, the one or more recesses include a first recess extending from the first outer perimeter portion into the body of the first housing towards the second outer perimeter portion and a second recess extending from the second outer perimeter portion into the body of the first housing towards the first outer perimeter portion.

Example embodiments of the invention are summarized here. Other embodiments can also be understood from the entirety of the specification as well as the claims filed herein.

What is claimed is:

1. A device, comprising:
a first housing formed of a first radio-transparent material and having an outer perimeter surface comprising a first outer perimeter portion and a second outer perimeter portion, the outer perimeter surface having one or more recesses, each of the one or more recesses extending from one of the first outer perimeter portion or the second outer perimeter portion into a body of the first housing, wherein the first housing further has a first interior recess extending from a first side of the first housing into the body of the first housing, and wherein first walls of the first housing define and bound the first interior recess;
a second housing formed of a second radio-transparent material and secured to the first housing, the second housing having a second interior recess extending from a second sides of the second housing into a body of the second housing, wherein second walls of the second housing define and bound the second interior recess, wherein outer surfaces of the second walls of the second housing at least partially extend into the first interior recess in a first direction substantially perpendicular to a lateral direction, and wherein the entirety of the second housing is within, in the lateral direction, the first walls;
a near field communication (NFC) chip disposed between the first housing and the second housing and within the second interior recess, wherein the NFC chip is enclosed by both the first housing and the second housing;
an adhesive disposed in the second interior recess and extending contiguously along a first sidewall surface of the second interior recess, along a bottom surface of the second interior recess and along a second sidewall surface of the second interior recess, wherein the first sidewall surfaces and second sidewall surface face each other and the bottom surface and define the second interior recess, wherein the adhesive is in direct contact with a top surface of the NFC chip, a first side surface of the NFC chip, and a second side surface of the NFC chip opposite the first side surface, wherein the NFC chip and adhesive substantially fill the second interior recess, wherein a bottom surface of the NFC chip is in direct contact with a bottom surface of the first interior recess, and wherein the NFC chip is a passive device; and
a link formed from a metallic material and having a first end and a second end, wherein the first end extends from the first outer perimeter portion into the body of the first housing towards the second housing, and the second end extends from the second outer perimeter portion into the body of the first housing towards the first outer perimeter portion, and wherein at least a first wall portion of a first wall of the first walls of the first housing is disposed directly between the NFC chip and the link.

2. The device of claim 1, wherein the first end of the link is formed from the metallic material, wherein the second end of the link is formed from the metallic material, and wherein portions of the first end and second end are disposed within the body of the first housing, and wherein long axes of the first and second end are aligned with each other.

3. The device of claim 1, wherein the outer perimeter surface comprises a lobe at least partially defined by the first outer perimeter portion and the second outer perimeter portion, and wherein the one or more recesses are disposed in the lobe.

4. The device of claim 1, wherein the link and the NFC chip are separated by a distance that is between 1 mm and 15 mm, and that is selected to avoid interference between the link and the NFC chip.

5. The device of claim 1, wherein the one or more recesses include a first recess extending from the first outer perimeter portion into the body of the first housing towards the second outer perimeter portion and a second recess extending from the second outer perimeter portion into the body of the first housing towards the first outer perimeter portion.

6. The device of claim 1, wherein the one or more recesses is a single recess that is a through hole extending from the first outer perimeter portion to the second outer perimeter portion.

7. The device of claim 1, wherein a bottom outer surface of the second housing is flush with, or at a level above, an upper lip of the first housing.

8. The device of claim 1, wherein a length and a width of the of the second interior recess are between 3.5 mm and 15 mm, and wherein a length and a width of the NFC chip are each between 3.5 mm and 15 mm and are each shorter than the respective length and width of the second interior recess.

9. A device, comprising:
a first housing formed of a radio-transparent material and having an outer perimeter surface comprising a first outer perimeter portion, a second outer perimeter portion, the outer perimeter surface having one or more recesses, each of the one or more recesses extending from the first outer perimeter portion or the second outer perimeter portion into a body of the first housing, wherein the outer perimeter surface comprises a lobe at least partially defined by the first outer perimeter portion and the second outer perimeter portion, wherein the one or more recesses are disposed in the lobe, wherein the first housing further has a first interior recess extending from a first side of the first housing into the body of the first housing, and wherein first walls of the first housing define and bound the first interior recess;

a second housing formed of a second radio-transparent material secured to the first housing, the second housing having a second interior recess extending from a second sides of the second housing into a body of the second housing, wherein second walls of the second housing define and bound the second interior recess, wherein outer surfaces of the second walls of the second housing at least partially extend into the first interior recess in a first direction substantially perpendicular to a lateral direction, and wherein the entirety of the second housing is within, in the lateral direction, the first walls;

a near field communication (NFC) chip disposed between the first housing and the second housing and within the second interior recess, wherein the NFC chip is enclosed by both the first housing and the second housing;

an adhesive disposed in the second interior recess and extending contiguously along a first sidewall surface of the second interior recess, along a bottom surface of the second interior recess and along a second sidewall surface of the second interior recess, wherein the first sidewall surfaces and second sidewall surface face each other and the bottom surface and define the second interior recess, wherein the adhesive is in direct contact with a top surface of the NFC chip, a first side surface of the NFC chip, and a second side surface of the NFC chip opposite the first side surface, wherein the NFC chip and adhesive substantially fill the second interior recess, wherein a bottom surface of the NFC chip is in direct contact with a bottom surface of the first interior recess, and wherein the NFC chip is a passive device; and a link formed from a metallic material and having a first end and a second end, wherein the first end extends from the first outer perimeter portion into the body of the first housing towards the second housing, and the second end extends from the second outer perimeter portion into the body of the first housing towards the first outer perimeter portion, and wherein at least a first wall portion of a first wall of the first walls of the first housing is disposed directly between the NFC chip and the link.

10. The device of claim 9, wherein the first end of the link is formed from the metallic material, wherein the second end of the link is formed from the metallic material, and wherein portions of the first end and second end are disposed within the body of the first housing, and wherein long axes of the first and second end are aligned with each other.

11. The device of claim 9, wherein the link and the NFC chip are separated by a distance that is between 1 mm and 15 mm, and that is selected to avoid interference between the link and the NFC chip.

12. The device of claim 9, wherein the one or more recesses include a first recess extending from the first outer perimeter portion into the body of the first housing towards the second outer perimeter portion and a second recess extending from the second outer perimeter portion into the body of the first housing towards the first outer perimeter portion.

13. The device of claim 9, wherein the one or more recesses is a single recess that is a through hole extending from the first outer perimeter portion to the second outer perimeter portion.

14. The device of claim 9, wherein a bottom surface of the second housing is flush with or at a level above an upper lip of the first housing.

15. A method, comprising:

providing a first housing formed of a first radio-transparent material having an outer perimeter surface comprising a first outer perimeter portion and a second outer perimeter portion, the outer perimeter surface having one or more recesses, each of the one or more recesses extending from one of the first outer perimeter portion or the second outer perimeter portion into a body of the first housing, wherein the first housing further has a first interior recess extending from a first side of the first housing into the body of the first housing, and wherein first walls of the first housing define and bound the first interior recess;

providing a second housing formed of a second radio-transparent material, the second housing having a second interior recess extending from a second sides of the second housing into a body of the second housing, wherein second walls of the second housing define and bound the second interior recess;

securing an near field communication (NFC) chip in the second housing and within the second interior recess, wherein the NFC chip is a passive device;

securing the second housing in the first housing, wherein the NFC chip is enclosed by both the first housing and the second housing, wherein outer surfaces of the second walls of the second housing at least partially extend into the first interior recess in a first direction substantially perpendicular to a lateral direction, wherein the entirety of the second housing is within, in the lateral direction, the first walls, wherein an adhesive is disposed in the second interior recess and extends contiguously along a first sidewall surface of the second interior recess, along a bottom surface of the second interior recess and along a second sidewall surface of the second interior recess, wherein the first sidewall surfaces and second sidewall surface face each other and the bottom surface and define the second interior recess, wherein the adhesive is in direct contact with a top surface of the NFC chip, a first side surface of the NFC chip, and a second side surface of the NFC chip opposite the first side surface, wherein the NFC chip and adhesive substantially fill the second interior recess, wherein a bottom surface of the NFC chip is in direct contact with a bottom surface of the first interior recess, and wherein the NFC chip is a passive device; and attaching a link formed from a metallic material and having a first end and a second end, wherein the first end extends from the first outer perimeter portion into the body of the first housing towards the second housing, and the second end extends from the second outer perimeter portion into the body of the first housing towards the first outer perimeter portion, and wherein at least a first wall portion of a first wall of the first walls of the first housing is disposed directly between the NFC chip and the link.

16. The method of claim 15, wherein the link and the NFC chip are separated by a distance greater than 1 mm.

17. The method of claim 15, wherein the outer perimeter surface comprises a lobe at least partially defined by the first outer perimeter portion and the second outer perimeter portion, and wherein the one or more recesses are disposed in the lobe.

18. The method of claim 15, wherein forming one or more recesses comprises forming one recess, the one recess being a through hole extending from the first outer perimeter portion to the second outer perimeter portion.

19. The method of claim 15, wherein one or more recesses is a single recess that is a through hole extending from the first outer perimeter portion to the second outer perimeter portion.

20. The method of claim 15, wherein the one or more recesses include a first recess extending from the first outer perimeter portion into the body of the first housing towards the second outer perimeter portion and a second recess extending from the second outer perimeter portion into the body of the first housing towards the first outer perimeter portion.

\* \* \* \* \*